(12) United States Patent
Cheng

(10) Patent No.: US 6,273,290 B1
(45) Date of Patent: Aug. 14, 2001

(54) HANDLE FOR A LID FOR AN ARTICLE OF COOKWARE

(75) Inventor: Stanley Kin-Sui Cheng, Kowloon (HK)

(73) Assignee: Meyer Manufacturing Company Limited (HK)

( * ) Notice: Subject to any disclaimer, the term of this patent is extended or adjusted under 35 U.S.C. 154(b) by 0 days.

(21) Appl. No.: 09/538,590

(22) Filed: Mar. 27, 2000

(51) Int. Cl.⁷ .................................................. B23P 3/00
(52) U.S. Cl. ..................... 220/755; 220/752; 220/753; 220/758
(58) Field of Search ........................... 220/755, 760, 220/752, 753, 573.1, 758

(56) References Cited

U.S. PATENT DOCUMENTS

| | | | |
|---|---|---|---|
| 174,520 | * 3/1876 | Graff | 220/752 |
| 358,580 | * 3/1887 | Stow | 220/752 |
| 369,721 | * 9/1887 | Kasch | 220/753 |
| 499,341 | * 6/1893 | Milne | 220/753 X |
| 597,754 | * 1/1898 | Williamson | 220/753 |
| 2,338,082 | * 1/1944 | Brewton | 220/768 X |
| 2,693,295 | * 11/1954 | Fasano | 220/753 |
| 3,846,902 | * 11/1974 | Sebring | 220/752 X |
| 4,059,867 | * 11/1977 | Adamis | 220/752 |

* cited by examiner

*Primary Examiner*—Steven Pollard
(74) *Attorney, Agent, or Firm*—Wood, Herron & Evans, L.L.P.

(57) ABSTRACT

A handle (8) for a lid (2) for an article of cookware is of a general "S" shape with a central portion (10) to be grasped by a user and a pair of arms (12) of reduced thickness extending to a pair of attachment points (14) at which the handle can be secured to a lid (2), wherein the distance of the portion to be grasped by a user to the nearest attachment point measured along the length of the handle is at least 9 centimeters.

18 Claims, 1 Drawing Sheet

HANDLE FOR A LID FOR AN ARTICLE OF COOKWARE

BACKGROUND OF THE INVENTION

The invention relates to a handle which can be used on a lid for an article of cookware.

A wide variety of handles for cookware lids are known. For example, it is known to provide a handle in the form of a knob formed of a material which has a low thermal conductivity, such as wood or plastics. Phenolic handles are particularly common. These handles suffer the drawback that these materials can degrade with repeated heating and with time.

It is also known to provide metal handles which are secured to the lid through welding or riveting. Such handles generally however suffer the drawback that they become too hot to safely touch during any extended heating.

The present invention seeks to provide a metal handle which overcomes these drawbacks.

SUMMARY OF THE INVENTION

In a first aspect of the invention there is provided a handle for a lid for an article of cookware wherein the handle comprises a portion to be grasped by a user arranged between a pair of attachment points at which the handle can be secured to a lid, wherein the distance of the portion to be grasped by a user to the nearest attachment point measured along the length of the handle is at least 9 centimeters.

Preferably, the portion to be grasped by a user is in the form of a central generally straight portion, and wherein there are provided a pair of arms extending from opposite ends of the central portion which curve back in the same general direction as the extent of the central portion and which terminate in the attachment points.

In a preferred embodiment the arms extend downwardly at an angle to the central portion in the region of 30° to 50°, whilst the central portion to be grasped by a user is of elongate cross-section of width considerably greater than its thickness, and the arms are of the smaller cross-section than the central portion.

The handle is preferably of an overall "S" shape, and is formed of stainless steel.

In a further aspect the invention resides in a handle for an article of cookware wherein the handle is generally of a "S" or inverted "S" shape having a central region to be grasped by a user and a pair of arms extending from opposite ends of the central region and curving back in the same general direction as the extent of the central portion, and which terminate in attachment portions at which the handle can be secured to a lid.

BRIEF DESCRIPTION OF THE DRAWINGS

An embodiment of the invention is now described, by way of example of only, with reference to the following drawings in which.

DESCRIPTION OF THE PREFERRED EMBODIMENT

Figure 2:
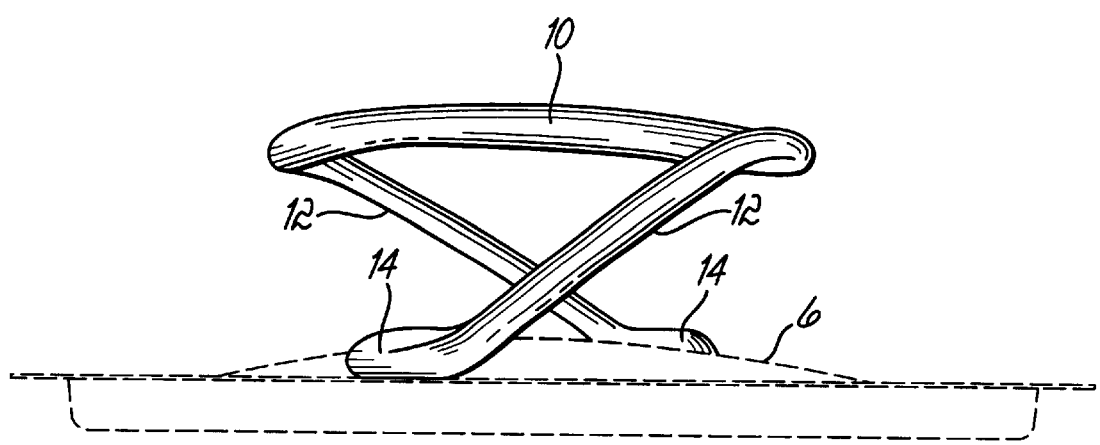
FIG. 2 is a side view of the handle of FIG. 1.

Turning to the Figures, these show a lid (in dotted lines) with a handle in accordance with an embodiment of the invention. The lid 2 is of conventional construction, having a central portion 6 surrounded by an outer rim 4, the central portion 6 doming slightly upwardly as can be seen in FIG. 2. Secured to the lid is a handle 8. The handle 8 is of an overall "S" shape when viewed from above having a central region 10 which is generally straight and of an elongate cross-section whereby the width of the region 10 is several times greater than its thickness. This region 10 constitutes a region to be grasped by a user. Extending from opposite ends of the central region 10 there are a pair of arms 12 of greatly reduced width (and therefore cross-sectional area) compared to the central region 10 which curve back in the same general direction as the direction of extent of the central region 10, although are inclined downwardly with respect to the plane of the region 10 by an angle in the region of about 30°–50°, and preferably about 40°. The arms 12 terminate in attachment regions 14 at which the handle 8 is secured to the lid 2 by welding and in particular projection welding, or by riveting as is conventional.

Figure 1:
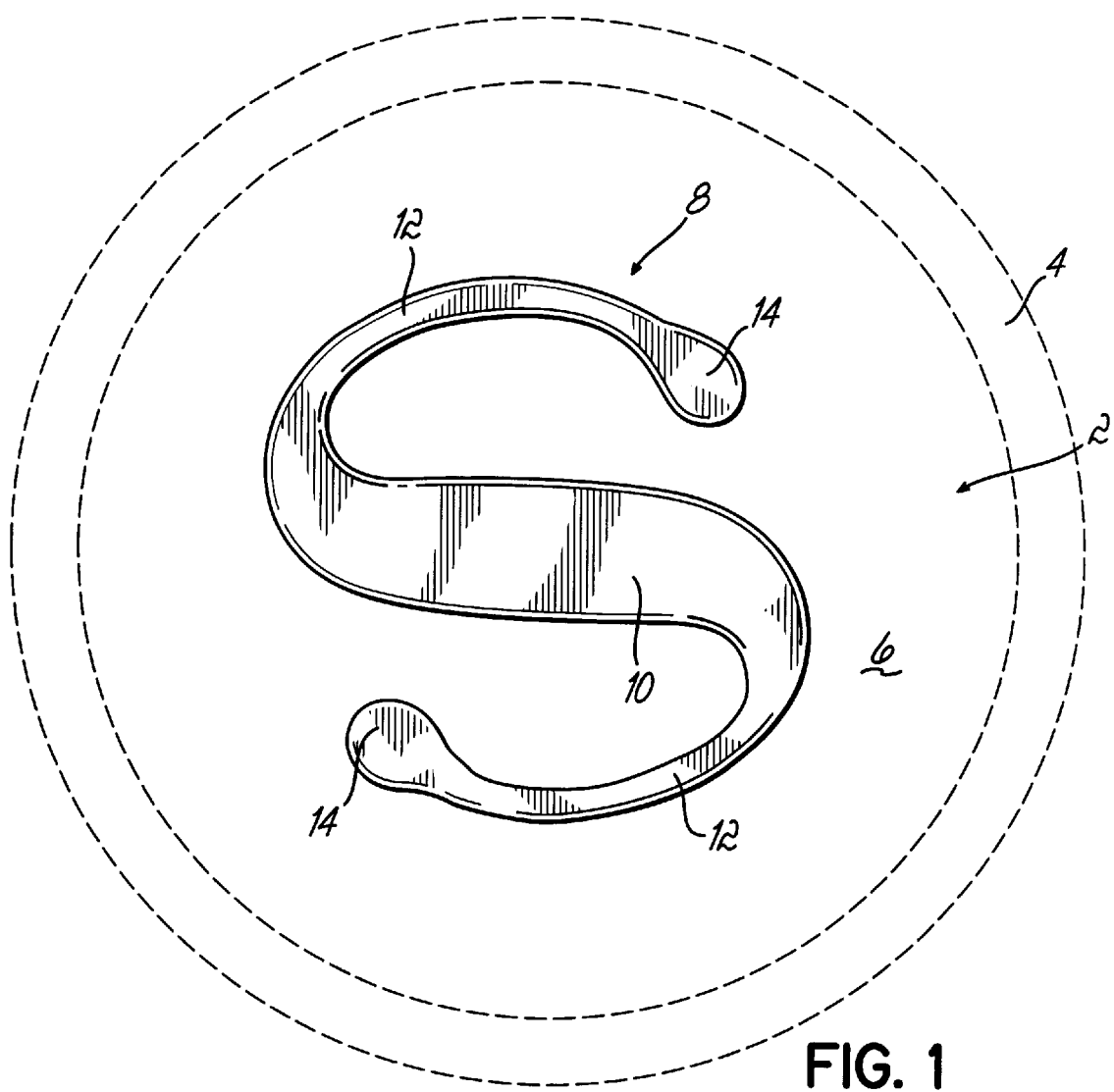
FIG. 1 is a view from above of a handle in accordance with the embodiment of the invention.

The shape of the handle 8 as described above ensures that there is a significant distance along the length of the handle from the central region 10 to the attachment regions 14. This significant difference ensures that the central region 10 remains relatively cool even during extended periods of cooking, the heat being dissipated from the arms 12, whilst the wide but thin central portion 10 also assists in dissipation from this portion 10. With the handle shape shown in FIG. 1 it is found that the distance from the midpoint of the portion 10 (marked X in the figure) to either of the attachment points is at least 9 centimeters and more preferably in the region of at least 13 centimeters. There is also a significant vertical clearance between the central position 10 and the is top of the lid, which further enhances the ability of the handle to remain cool. This handle has an overall dimension whereby the straight-line distance between the centre of the attachment regions 14 is about 7.5 cm, whilst the arms 12 are of generally circular cross-section of about 4 mm diameter, whilst the central portion 10 has a width of about 2 cm and a depth of about 5 mm.

In tests conducted by the applicant lids of a variety of sizes from 14 centimeters to 30 centimeters in diameter were tested, each having a handle 8 formed of stainless steel as described above secured to a stainless steel lid by welding. The pan was filled with water up to a depth at least covering the rivets of the pan side handle and boiled for a minimum of 20 minutes. It was found that the temperature at the central region 10 was typically in the range of 47 to 49° C., which temperature is perfectly safe and comfortable to touch with the bare hand. It is generally preferred that the central portion is less than about 30° C. over ambient temperature so as to be sufficiently cool for comfortable and safe grasping.

A variety of other handle shapes may be employed, provided that the region which is to be grasped by the user is sufficiently distant from the attachment regions.

What is claimed is:

1. A handle for a lid of an article of cookware wherein the handle comprises a metal portion to be grasped by a user arranged between a pair of metal arms, each of the pair of arms being integral with and extending downwardly at an angle from an opposite end of the portion to be grasped by a user and each of the arms configured to be secured at an attachment point to the lid, wherein the distance between the midpoint of the portion to be grasped by a user to the nearest attachment point measured along the length of the handle is at least 9 centimeters, at least one of the pair of arms is uncoiled and foldfree, and at least one of the pair of arms has a smaller cross-sectional area than the portion to be grasped by a user.

2. A lid handle according to claim 1 wherein the portion to be grasped by a user is in the form of a central generally straight portion, and wherein each of the pair of arms curves back in the same general direction as the extent of the central portion.

3. A lid handle according to claim 2 wherein the central substantially straight portion is substantially parallel to the lid surface.

4. A lid handle according to claim 1 wherein each of the pair of arms has a substantially straight shape.

5. A lid handle according to claim 4 wherein the angle is in the region of 30° to 50°.

6. A lid handle according to claim 1 wherein each of the pair of arms is of smaller cross-sectional area than the central portion to be grasped by a user.

7. A lid handle according to claim 1 wherein the overall shape of the handle is an "S" shape or an inverted "S" shape.

8. A lid handle according to claim 1 wherein the metal is a stainless steel.

9. A lid for an article of cookware having a handle according to claim 1.

10. A lid according to claim 9 wherein the handle is secured to the lid by welding.

11. A lid according to claim 9 wherein the handle is secured by the lid by riveting.

12. A lid handle according to claim 1 wherein the portion to be grasped by a user is of elongate cross-section of width considerably greater than its thickness.

13. A handle for an article of cookware wherein the handle is substantially of an "S" shape or an inverted "S" shape having a central region to be grasped by a user and a pair of arms extending from opposite ends of the central region and curving back in the same general direction as the extent of the central region, and which terminate in attachment portions at which the handle can be secured to a lid, the central region and the pair of arms having an integral, one-piece construction.

14. A handle according to claim 12 wherein each of the pair of arms is of smaller cross-sectional area than the central region.

15. A handle for an article of cookware according to claim 13 wherein the metal is a stainless steel.

16. A handle for an article of cookware according to claim 13 wherein the central portion to be grasped by a user and the pair of arms are composed of a metal.

17. A handle for an article of cookware according to claim 13 wherein at least one of the pair of arms being uncoiled and foldfree.

18. A handle for an article of cookware according to claim 13 wherein the central substantially straight portion is substantially parallel to the lid surface.

* * * * *